March 14, 1950     J. F. WERDER     2,500,781
LUBRICANT PURIFICATION SYSTEM AND APPARATUS
Filed June 28, 1944
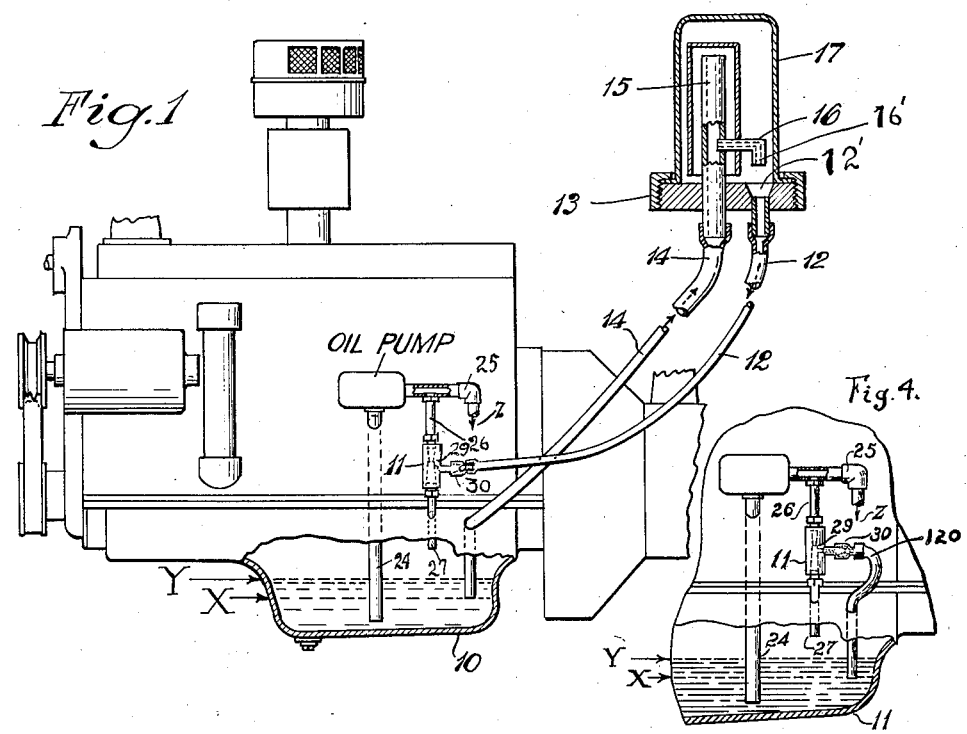
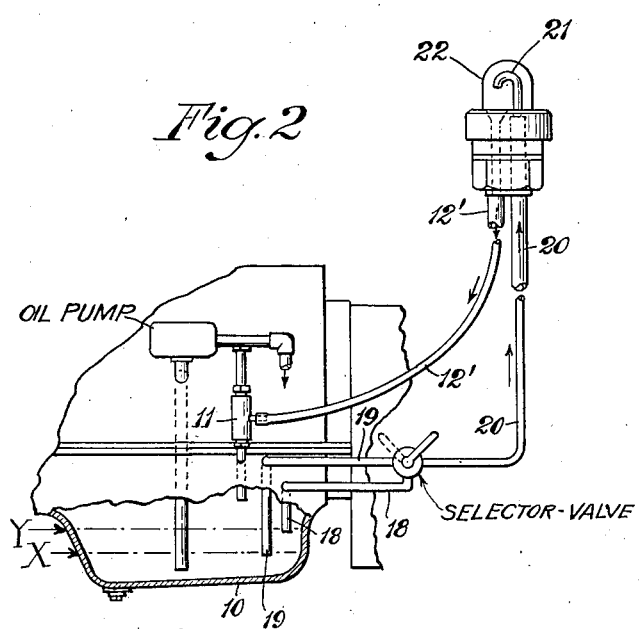
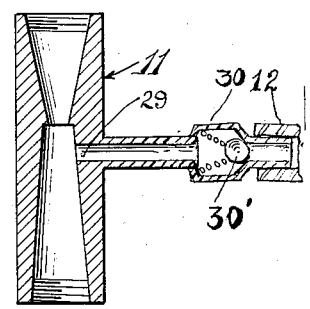
Inventor
John F. Werder
by *[signature]*
Attorney.

Patented Mar. 14, 1950

2,500,781

UNITED STATES PATENT OFFICE 2,500,781

LUBRICANT PURIFICATION SYSTEM AND APPARATUS

John F. Werder, Chagrin Falls, Ohio; Frances Keller Werder, executrix of said John F. Werder, deceased, assignor to The Zip Abrasive Company, Cleveland, Ohio, a corporation of Ohio Application June 28, 1944, Serial No. 542,477

3 Claims. (Cl. 184—6)

My invention relates to improvements in pressure induced lubricant circulating systems and apparatus therefor.

It is an object of my invention to provide for purification of lubricant in a lubricant circulating system for mechanisms.

Another object of my invention is to provide for purification of lubricant for internal combustion engines.

Another object of my invention is to accomplish, by novel arrangement of apparatus, the precipitation of impurities of colloidal or other analogous nature from lubricating oil of a pressure-induced circulating system for liquid lubricants.

Another object of my invention is to achieve the foregoing objects by a novel arrangement of apparatus, the latter so constructed as to provide improved means therefor whereby an operator or attendant may visually determine the nature of the operation of the apparatus employed.

It is a further object of my invention to provide means for indicating the amount of oil or the level of oil in the crank case of an internal combustion motor.

Other objects of my invention and the invention itself will become apparent from a perusal of the following description and the appended drawings, in which drawings:

Fig. 1 is a view of the oil purification and indicating system of my invention as applied to an automobile engine, portions being shown in side elevational, other portions being shown in vertical cross section;

Fig. 2 is a view similar to that of Fig. 1 but showing another embodiment of my invention;

Fig. 3 is an enlarged longitudinal medial sectional view of the aspirator of Figs. 1 and 2, and a check valve associated therewith; and Fig. 4 is a view similar to a fragment of Fig. 1 of another embodiment of my invention wherein the indicating function of the apparatus is omitted.

For clarity of disclosure, some of the parts illustrated in the foregoing drawings are purposely exaggerated in relative size from that size which ordinarily would, for practical reasons, be employed.

Referring now to the drawings, in all of which like parts are designated by like reference characters, the apparatus involved herein is shown as being applied to the lubricating system of an internal combustion engine of the type commonly employed for propelling motor vehicles, said lubricating system being of the circulatory type with liquid lubricant continuously pumped by an oil pump through an intake conduit 24 leading from the crank case 10 of said engine.

Oil from said pump is in any customary manner supplied from said pump through a conduit system exemplified herein as the conduit 25 leading to the various bearings of the engine to be supplied with the lubricant.

To such a lubricating system, the apparatus of my invention is applied by the provision of a conduit 26 terminating at 27 in the crank case compartment preferably above the level of liquid lubricant contained therein, there being an intermediately disposed Venturi section comprising the Venturi unit 11 having a lateral throat opening 29 which is in fluid communication with the conduit 12 through a ball check valve casing 30.

The unit 11 with its Venturi passage and throat opening constitutes an aspirator when fluid flow under pressure is forced through the same from the pump to the crank case. The effect of the form of the Venturi passage through the aspirator unit 11 is, as is well known, to cause the fluid to achieve its maximum velocity at the throat of the venturi relative to the velocity at the approach and discharge ends of the aspirator tube whereby at the point 29 in the region of the throat, a very considerable reduction in fluid pressure is effected, and in the aspirator of my invention, such reduction of pressure is of such subatmospheric value as to approach that of a vacuum.

When a conduit such as the conduit 12 is placed in communication with such a point 29 maintained at subatmospheric pressure any fluid so disposed as to flow through the conduit 12 will be supplied through the conduit 12 to said Venturi throat in the effort to increase the pressure at this point. Therefore, to carry out the purposes of my invention, the conduit 12 is connected through an opening 12' to the interior of a sight chamber 17, to which lubricant from the crank case 10 may be supplied through another conduit 14. A standpipe 15 with spigot 16 is so disposed within the interior of the chamber, and discharges lubricant received from the conduit 14, through the conduit 12 to the throat of the venturi of the aspirator 11, said lubricant being then, together with the oil received from the oil pump through the conduit 26, discharged through the discharge port 27 to the crank case, said discharge port, in the preferred embodiments illustrated in the drawings, being disposed above the level of liquid in the crank case, whereby, obviously, the discharged liquid flows freely from said port.

The surface of the liquid in the crank case 10 being substantially at atmospheric pressure, such atmospheric pressure is much higher than that at the Venturi throat, and that within the chamber 17, and therefore is effective to force the lubricant through the conduit 14 and into the chamber 17.

In actual operation under the conditions prevalent in such an installation as is herein illustrated, lubricant at higher pressure constantly flows through the conduit 14 and stands at varying levels within the standpipe 15 according to the rate of discharge of such lubricant from the casing 17 through the spigot 16, conduit 12, aspirator 11, and back to the crank case through the discharge port 27.

The chamber enclosing cover 17 is made either entirely of transparent material or at least has a portion of its front wall facing the spigot 16 made of transparent material, whereby the operator viewing the spigot 16 through a transparent portion of the wall, under normal conditions of operation of the engine, will see the oil passing from the spigot 16. Such oil will descend from the spigot in drops, by the effect of gravity to the floor of the chamber and will then be drawn into the conduit 12 by the effect of the greater pressure existing within the casing 17, over that which is effective at the remote end of the conduit 12 which terminates at the aspirator venturi.

Therefore, the operator viewing the drops of oil through the transparent casing wall 17 of appropriate portion thereof may, by the observed frequency of the oil drops, be able to determine if the system is operating in the proper manner and if not, due to any disorganization from whatsoever cause of the lubricating system either by clogging of the oil distributing conduits or inoperativeness of the engine or from whatever other cause as may prevail, the operator will thus receive notice thereof prior to any damage being done to the bearings and should investigate and remedy the fault.

As previously stated, aside from the advantages accruing through the indicator system which is one objective of my invention, other advantages accrue. The chief other advantage resides in the discovery that such a system employing such an aspirator as herein disclosed, or any other similarly operated substituted pressure reducing mechanism, whereby different fractions of the oil are successively subjected to subatmospheric pressure, as is accomplished in the region of the throat of the venturi is herein disclosed, is resultantly purified.

Although I do not fully understand the modus operandi which causes such purification, I find that a system organized as herein illustrated and described, when applied to lubricating oil which has been in use for such a length of time, or under such condition of use as to have become contaminated by the inclusion therein of the various substances commonly found in any such lubricant, continuously separates and deposits such foreign substances at the bottom of the crank case.

In other words, the foreign substances subjected to the above action are of a sufficiently colloidal or colloidal-like nature as to permeate the lubricant of the system, and after being subjected to the subatmospheric pressure effects present in my improved system, rapidly becomes clarified, said substances settling out of the oil, and descending by gravity to the bottom of the crank case.

For this reason, I so dispose the intake end of the conduit 14 at such a level such as that shown at $x$ where if the supply of oil in the crank case is properly replenished from time to time, oil will be drawn through such conduit intake end and without drawing too much of the contaminated foreign substances at any time into the conduit 14.

Again, should the operator of the engine neglect to replenish the oil and the upper surface thereof within the crank case becomes lower than the level $x$, the operator will immediately be apprised of such a condition by noting that no drops of oil are descending from the spigot 16.

I find employing the improvements hereof in connection with an automobile engine that continued operation maintains the oil in such an improved condition that the same oil can be used much longer than would otherwise be the case, thereby effecting a very considerable economy to the purchaser of the oil, and additionally, undue wear of the bearings is avoided as a result of the continued use of clarified oil during all of the time the engine is in operation.

Preferably, I install in the line of the conduit 14, a check valve casing 30 wherein a valve ball 30' is yieldably pressed against a valve seat to close the passage between the Venturi throat 29 and the conduit 12, to prevent flow of fluid in the direction from the venturi to the casing 17, as for instance, when starting a cold engine with the lubricant in a much congealed condition, whereupon otherwise when such thick congealed oil from the pump is forced through the venturi the resistance of the discharge pipe 27 whose bore is relatively small, would create back pressure to force lubricant through the conduit 12 to fill the chamber 17. The check valve ball 30' prevents such reversed flow, though readily becoming unseated to permit flow towards the Venturi throat. The ball check valve 30' and associated parts are illustrated in the enlarged sectional view of Fig. 3.

Although unimportant, it may be said that the chamber 17 may, at times, be flooded or partially flooded when a hot engine is stopped and remains in repose in cold weather for a considerable period due to the thermal contraction of the air within the casing 17 whereby some oil under such conditions some times will be drawn upwardly through the conduit 14 into the casing; however, after the engine is started and run for a very short time, the oil will be withdrawn through the conduit 12, and the chamber 17 will be quickly cleared of the oil previously drawn into it by consideration of air and will operate as previously described.

In Fig. 2, the apparatus is shown in somewhat different form; substantially, the chamber 22 with spigot 21 is shown more in the form of a fountainhead and operates as does the chamber 17 and spigot 16, the main difference in the two installations being, however, in the provision of the selector valve which, upon being adjusted to two alternative positions shown by solid and dotted lines respectively, permit the conduit 20 (corresponding to conduit 14, Fig. 1) leading from the lubricant in the crank case 10 to be drawn through either the more elevated intake pipe 18 or a lowermost intake pipe 19. A check valve such as provided at 30, Fig. 1, will preferably also be similarly provided in the conduit 12' of Fig. 2.

In using the apparatus employing such selector valve and a pair of intake pipes as shown in Fig. 2, the operator will normally operate the selector valve to place the conduits 18 and 20 with the valve.

Should the oil supply be depleted from the level $y$ down to a level $x$, the operator by noting the discontinuance of oil dropping from the spigot 21 will know that the oil has been depleted below the level $y$, i. e., below the lowermost intake end of the valve and, then readjusting the valve to its alternative position where the conduit 19 is placed to communicate with the conduit 20, whereupon the dropping of oil from the indicator spigot will be resumed until the lubricant in the crank case falls below the level $x$ and below the intake end of the conduit 19 whereupon the operator will receive another warning to replenish the depleted oil supply, by observing the discontinuance of dropping oil from the spigot.

From the foregoing, the alternative embodiment of Fig. 4 will be well understood, the parts, with the exception of the conduit 120, being the same as in Figs. 1 and 4, the indicating apparatus 13 to 16 inclusive being omitted. In this embodiment, the conduit 120 corresponding to the conduit 12 of Fig. 1 leads directly to the oil in the crank case.

The operation of the apparatus is the same as previously described with the exception that oil previously withdrawn by the conduit 14, and supplied through the indicating device and conduit 12 through the ball check valve 30 to the throat of the injector 11, will now be directly supplied from the reservoir 10 through the conduit 120 to the approach side of the valve casing.

Having thus described my invention in different embodiments thereof, I am aware that numerous and extensive departures may be made from the embodiments which are herein presented and which convey an understanding of my invention and apparatus now preferred by me to achieve the purposes thereof, without departing from the spirit of my invention and the scope of the appended claims.

I claim:

1. In combination with a circulating lubricating system comprising a pump for withdrawing liquid lubricant from a lubricant reservoir and for circulating the lubricant under pressure to bearings of a mechanism from whence said lubricant is returned to said reservoir, of a by-pass conduit for returning a minor portion of the lubricant from the high pressure discharge side of said pump to said reservoir, an aspirator serially interposed in said conduit, said aspirator provided with a relatively restricted throat bore through which lubricant from said pump is forced at relatively high velocity while exerting relatively reduced pressure compared to the lower velocity and higher pressure of lubricant at the approach and discharge sides of said throat, conduit means having an inlet port disposed below the level of fluid in the reservoir and an outlet port opening into said aspirator throat, whereby atmospheric pressure exerted upon the surface of the lubricant in the reservoir is effective to cause liquid to flow from said reservoir into said throat.

2. In combination with a high pressure circulating lubricating system employing a pump for withdrawing liquid lubricant from a lubricant reservoir and for circulating the same under pressure through bearings of a mechanism again to said reservoir, an aspirator device by-passing said bearings and discharging a minor quantity of liquid under pump pressure to the reservoir, and conduit means leading from below the surface of reservoir liquid to the throat of said aspirator for conducting an aspirator-induced minor flow of liquid from the reservoir to be returned directly thereto, a sight chamber interposed in the line of said aspirator-induced minor flow having upper and lower port openings, one of said port openings being disposed above the level of the other port opening and adapted to discharge lubricant from the reservoir into the interior of the chamber drop-by-drop, and the said lower port opening adapted to communicate lubricant deposited from the upper port from said chamber to the throat of said aspirator.

3. In combination with the crank case of an automobile engine, and an oil pump adapted when operated to circulate oil withdrawn from the crank case under pressure to the engine bearings, a by-passing conduit adapted to return a minor flow of the oil from the discharge side of said pump to the crank case, an aspirator having a minor flow conducting bore disposed in the line of flow of said by-passing conduit and said bore having a constricted throat portion whereby said minor flow achieves highest velocity and exerts a substantially high degree of subatmospheric pressure against the walls of said throat, a second conduit for conducting a second minor flow of lubricant from the crank case to the region of said aspirator passage disposed closely adjacent the discharge side of said aspirator orifice.

JOHN F. WERDER.

REFERENCES CITED

The following references are of record in the file of this patent:

UNITED STATES PATENTS

| Number | Name | Date |
| --- | --- | --- |
| 1,484,607 | Hunt | Feb. 19, 1924 |
| 1,555,664 | Hall | Sept. 29, 1925 |
| 1,624,689 | Sweetland | Apr. 12, 1927 |
| 1,705,317 | Stokes | Mar. 12, 1929 |
| 1,874,976 | Hans | Aug. 20, 1942 |

FOREIGN PATENTS

| Number | Country | Date |
| --- | --- | --- |
| 393,934 | France | 1908 |